Nov. 29, 1932.    F. W. LAKE    1,889,730
COMPUTING AND RECORDING DYNAMOMETER AND STROKE METER
Filed Aug. 21, 1928    2 Sheets-Sheet 2
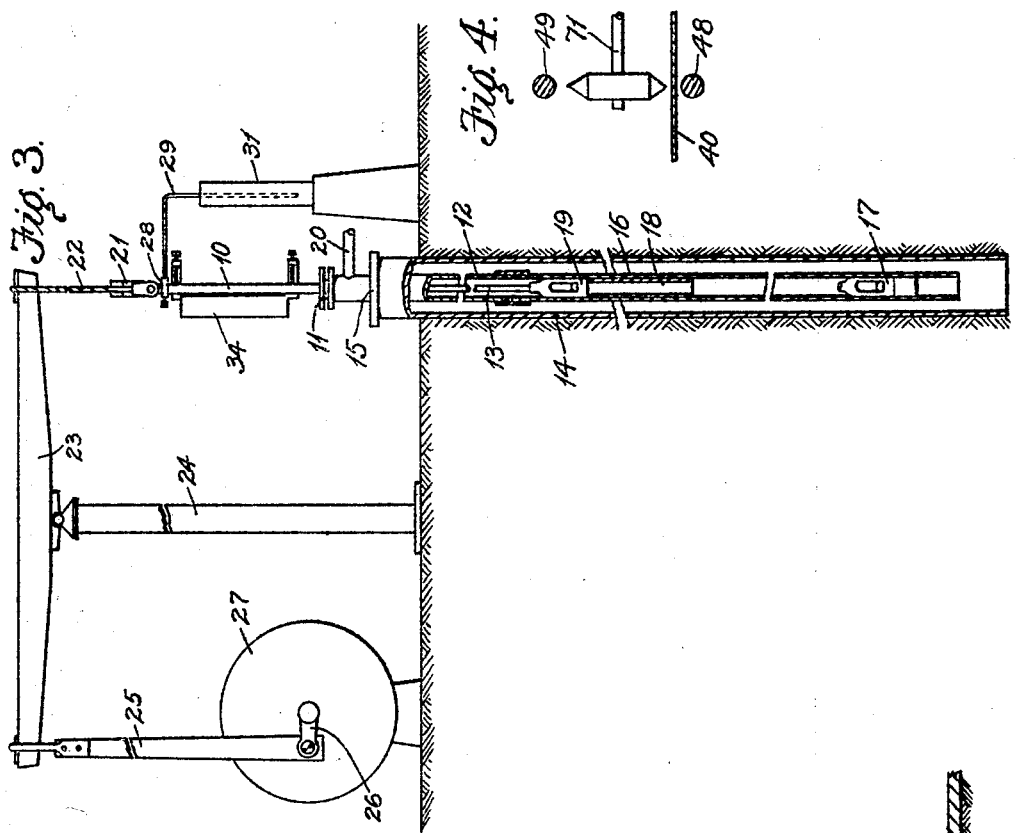
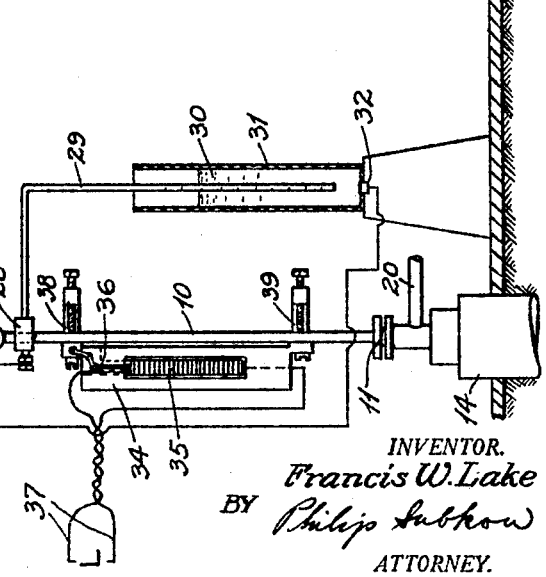
INVENTOR.
Francis W. Lake
BY Philip Subkow
ATTORNEY.

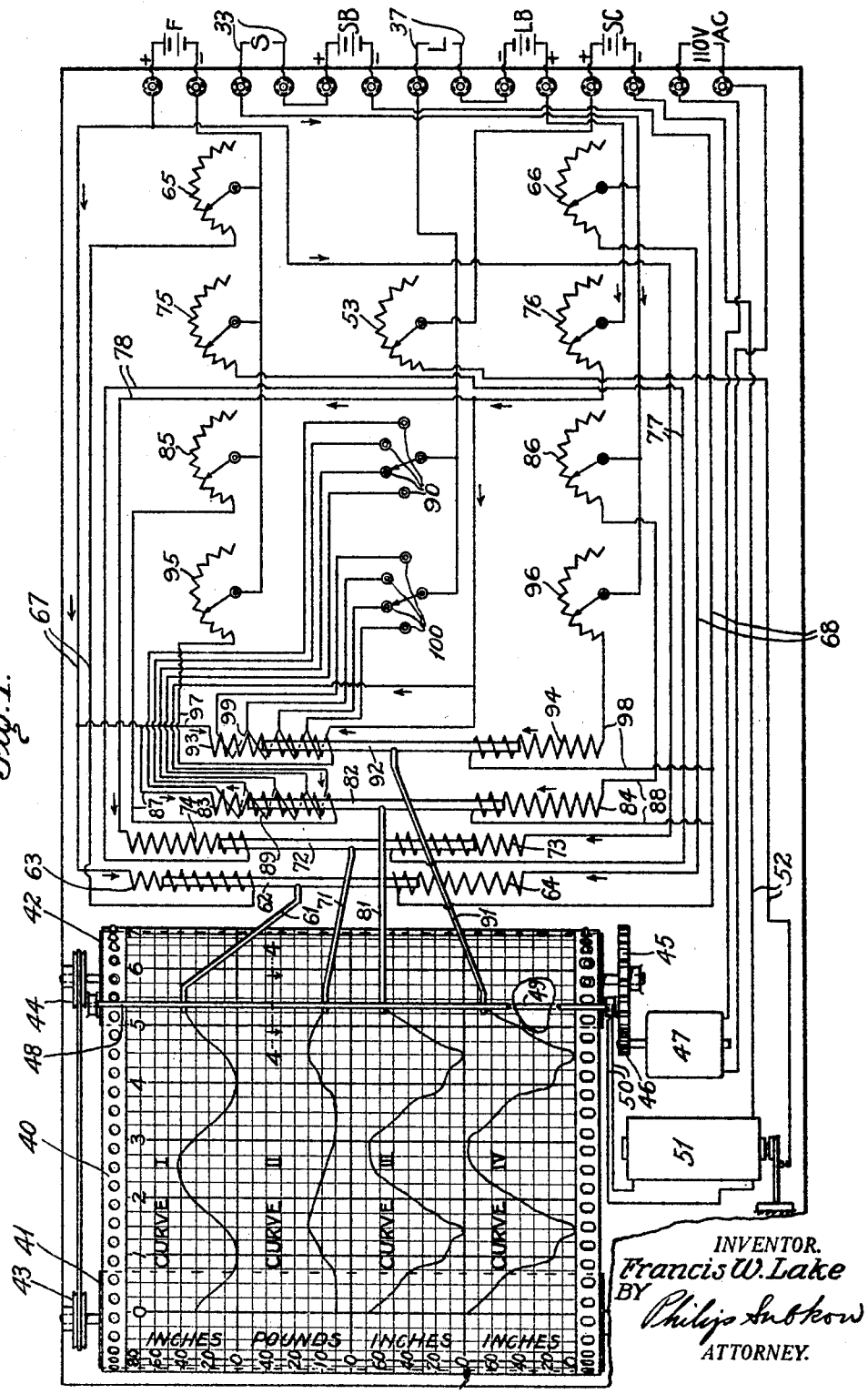

Patented Nov. 29, 1932

1,889,730

UNITED STATES PATENT OFFICE

FRANCIS W. LAKE, OF WHITTIER, CALIFORNIA

COMPUTING AND RECORDING DYNAMOMETER AND STROKE METER

Application filed August 21, 1928. Serial No. 301,012.

This invention relates to an apparatus for determining at one point the forces exerted upon an elastic member, loaded at a remote point, and undergoing variations in load and in position. The object is to determine at one point the work done by said movable member.

It is particularly directed to the determination of the work done by a pump piston, which pump piston is actuated by a long piston rod. More particularly, it is directed to the measurement of work done by a deep well pump of the reciprocatory variety wherein a plunger operated at great depth is reciprocated by an extremely long "sucker rod", perhaps a mile in length, the reciprocatory power being applied at the surface and the measurements of the work done by the plunger being recorded at the surface.

It is an object of this invention to obtain a true measurement of the relative motion of the plunger with respect to a fixed point at the surface and also with respect to the working barrel or plunger cylinder, measuring at the same time the variations in load on the plunger throughout its cycle of operation. By so measuring and recording the several variables, an actual record of the work and efficiency of the pump may be obtained. From this record the required changes in procedure and in pump elements necessary to obtain maximum efficiency can be determined.

In order to fully describe and illustrate my invention, a preliminary consideration of the forces exerted on the several parts of a well pumping apparatus will be helpful. It is well understood that the sucker rod stretches and that the amount of stretch is directly proportional to the load thereon, whether this load be merely weight of the rod itself or the rod weight plus oil load, plus friction, plus any other entering factors. The load represented by these combined influences is herein termed "the total load". In lifting such a loaded rod, it is necessary to apply a force sufficient to overcome said total load and start the rod with its plunger and its oil load. If I place a dynamometer between the "polished rod" or top sucker rod and the walking beam, or other rod-actuating means, I find that the load registered by the dynamometer in general builds up rapidly to its maximum during the first part of the up stroke, the registered load increasing until all retarding influences have been overcome; during the remainder of the up stroke the load shown by the dynamometer falls off gradually and during the down stroke continues to fall off since the oil load is released. This continues until the walking beam begins to slow up materially as the crank which operates the latter moves toward dead center, whereupon the load again begins to increase due to the momentum developed in the descending rods, the load increasing further as the up stroke commences and the cycle begins again. These changes in load represent changes in stretch in the rod. A similar but oppositely operating set of conditions develops in the pump tubing also, as more fully described hereinafter. Thus, the effective plunger movement is determinable only through consideration of all of the factors mentioned.

Therefore, it is also an object of this invention to measure and record the polished rod stroke, to measure and record the load variations, to determine and record the actual plunger movement, and to determine and record the movement of the plunger in relation to the working barrel on the pump tubing, that is to determine the effective plunger stroke. It is also an object to obtain all of these results and records automatically.

The invention generally speaking may be considered to reside in apparatus for accomplishing these objects. I have found that a recording apparatus may be provided for recording upon a time-operated chart a curve representing the sucker rod stroke, and also that a recording dynamometer may be employed for recording upon said chart a second curve representing the load variations transmitted to the dynamometer, and that the actual plunger movement on the lower end of the sucker rod may be calculated from the data disclosed by the recorded curves when certain known constants regarding stretch are taken into consideration, I have found further that the relative movement of the plunger with respect to the working barrel can be calculated in a similar fashion from the data disclosed by the other curves. I have also discovered that by employing needle arms or the like to record the two curves mentioned and by further employing two additional needle arms, connections may be provided between the various needle arms or between the forces actuating the same whereby said calculations of actual plunger movement and effective plunger movement may be automatically made and automatically inscribed upon said chart in the form of two additional curves, whereby the data represented by all four of the curves will be automatically recorded on the chart. In a specific form these connections serve to add the relative movements of certain arms to those of other arms, or to subtract such movements, in order that the resultants may be described by the corresponding needles.

The invention therefore also includes means for measuring and recording the pump stroke on the chart, means for measuring and recording the total load changes, means operatively connected with the mentioned means for automatically calculating and recording actual plunger movements, and means operatively associated with the various other devices for automatically calculating and recording the effective plunger stroke, that is, the stroke of the plunger with relation to the working barrel. Preferably a time-controlled chart is employed in connection with the various recording devices in order that the records may be in the form of extended curves to represent as many cycles over corresponding time periods as required.

Obviously, only those curves finally desired need be actually recorded on the chart. Similarly, the computation and recording need extend only to the plunger movement, or to the effective plunger movement.

For purposes of illustration, reference is made to the drawings accompanying this application, which drawings disclose one embodiment of apparatus adapted for practicing my invention and wherein, Fig. 1 is a detailed although largely diagrammatic view of the recording apparatus showing the various curves which may be recorded by the various needle arms thereof and the detailed electrical connections which may be employed to operate said arms; and Figs. 2 and 3 show in elevation the parts of a deep well pump and the relation of the recording mechanism thereto.

Fig. 4 is a detail showing the relation of the point or extremity of each needle arm to the chart paper and the cooperating wires of a spark apparatus.

The drawings disclose the usual polished rod 10 of a deep well pump which rod passes through the stuffing box or packing gland 11 into the pump tube 12, the lower end of said polished rod being affixed to the upper end of the sucker rod string 13 in the usual fashion. The tube 12 depends within the well casing 14 through the casing head 15 and carries on its lower end the working barrel 16 having at the bottom a standing or foot valve 17 above which the pump plunger 18 reciprocates with its traveling valve 19 for the purpose of pumping an oil column up through the tubing 12 and discharging it through a flow pipe 20.

To the upper end of the polished rod 10, I affix any form of polished rod clamp 21 which is connected by any bail or other device 22 with a walking beam 23 rocking upon the sampson post 24 and actuated through the medium of a pitman 25 and a crank 26 from a band wheel 27 in turn actuated by any prime mover.

To the polished rod 10, I attach a clamp 28 rigidly supporting an electrical conductor rod 29 which depends into an electrical resistance solution 30 held in a container 31 in the bottom of which is an electrical contact 32 so arranged that the polished rod motion directly varies the distance between the end of the electrical conductor rod 29 and the electrical contact 32 so that when an electrical current is passed through electrical conductors 33, the strength of the current increases proportionately as the polished rod 10 approaches its maximum down stroke position.

To the polished rod 10, I also attach by clamps 38 and 39 a case 34 containing a carbon stack 35 so arranged in connection with levers 36 that the stretch in the polished rod 10 between clamps 38 and 39 imposes a compression upon the carbon stack 35 thereby varying its resistance to an electric current proportionately with the load on the polished rod so that if an electric current be passed through electrical conductors 37, the strength of said electric current will increase as the load on the polished rod 10 increases and decrease as the load on the polished rod 10 decreases. This device thus constitutes an electrical dynamometer.

The chart paper 40 upon which the curves are inscribed is carried on rollers 41 and 42 operated through pulleys 43 and 44 and gears 45 and 46 from a synchronous electric motor 47 which is operated by a 110 volt alternating current. This arrangement provides for moving the chart paper at a uniform velocity underneath the needle arms 61, 71, 81, and 91. Two platinum wires 48 and 49, one underneath chart paper 40 and the other above needle arms 61, 71, 81, and 91 are connected through electrical conductors 50 with a spark coil 51 operated from an electrical battery SC through electrical conductors 52 and variable resistance 53 so that sparks are caused to pass between platinum wires 48 and 49 at the points of needle arms 61, 71, 81, and 91 to inscribe curves on chart paper 40 by penetrating and slightly charring the same in a well known manner. This apparatus therefore provides means for continuously recording the changes in position of needle arms 61, 71, 81, and 91.

The needle arms 61, 71, 81, and 91 are carried by solenoid cores 62, 72, 82, and 92, respectively, which are actuated through the medium of varying electric currents passing through a plurality of circuits. For the purposes of descriptions herein the currents in these circuits are considered to flow from positive to negative and the directions of flow are indicated by arrows in order that the hook-up may be more readily followed. The coils 63, 73, 83, and 93 which are supplied by a constant current from the field battery F indicated, are provided merely for the purpose of balancing the rods 62, 72, 82, and 92, through adjustable resistances or control rheostats 65, 75, 85, and 95, thereby obtaining zero positions. The rods and needles themselves are actuated by the variable currents through coils 64, 84, and 94, which convey the effects of the polished rod stroke, and those through coils 74, 89, and 99, which convey the effects of the load changes.

Considering these operations in greater detail, needle arm 61 is rigidly connected with solenoid rod 62 which is so arranged as to move freely in solenoid coils 63 and 64. An electric current passes through electrical conductors 67 and adjustable resistance 65 and solenoid coil 63 from field battery F, serves to balance and tends to hold solenoid rod 62 and needle arm 61 in an upper position. The electric current from the stroke battery SB passing through adjustable resistance 66, electrical conductors 68, solenoid coil 64, electrical conductors 33, and the variable resistance 29, 30, 32, tends to pull solenoid rod 62 and the needle arm 61 downward as the strength of the electric current increases with the down stroke of the polished rod 10 by reason of the increasing submergence of the conductor rod 29 in the electrical resistance solution 30, thus providing means for recording curve I on chart 40 which gives the relative polished rod stroke with respect to a fixed point.

An electric current passed from the field battery F through electrical conductors 77, adjustable resistance 75, and solenoid coil 73 tends to hold solenoid rod 72 and needle arm 71 in a lower position. The electric current from the load battery LB passing through adjustable resistance 76, electrical conductors 78, solenoid coil 74, electrical conductors 37, and the variable resistance 35, tends to pull the solenoid rod 72 and needle arm 71 upward as the strength of the electric current increases with increasing load on the polished rod 10 in its relation to electrical resistance 35, thus providing means for recording curve II on chart 40 which gives the relative load throughout the pumping cycle.

An electric current passed from the field battery F through electrical conductors 87, adjustable resistance 85, and solenoid coil 83 tends to hold solenoid rod 82 and needle arm 81 in an upper position. The electric current from the stroke battery SB passing through adjustable resistance 86, electrical conductors 88, solenoid coil 84, electrical conductors 33, and the variable resistance 29, 30, 32 tends to pull solenoid rod 82 and needle arm 81 downward as the strength of the electric current increases with the down stroke of the polished rod 10 when the conductor rod 29 is increasingly submerged in the electrical resistance solution 30, the reverse taking place on the up stroke. At the same time, the electric current from the load battery LB passing through adjustable resistance 76, solenoid coil 89, as adjusted by switch and contacts 90, by reason of being passed in the opposite direction to that passed through coil 83 tends to counteract the magnetic attraction of solenoid coil 83 for solenoid rod 82 in proportion to the decreasing or increasing strength of the electric current through the increasing or decreasing resistance 35 with the decreasing or increasing load on the polished rod 10 (as hereinafter more fully described), thus providing means together with the magnetic attraction of solenoid coil 84 for recording curve III which represents the plunger stroke with respect to a fixed point considering the polished rod stroke and the stretch in the sucker rod 13 caused by varying load conditions. The adjustable switch connections 90 provide means for multiplying the effect of the changes in the strength of the electric current in the load circuit and its effect on solenoid rod 82 for various conditions of sucker rod diameter, depth, and material, by increasing or decreasing the number of active wraps in coil 89, as hereinafter more particularly described.

An electric current passed from the field battery F through electrical conductors 97, adjustable resistance 95, and solenoid coil 93 tends to hold solenoid rod 92 and needle arm 91 in an upper position. The electric current from the stroke battery SB passing through adjustable resistance 96, electrical conductors 98, and solenoid coil 94, electrical conductors 33 and the variable resistance 29, 30, 32, tends to pull solenoid rod 92 and needle arm 91 downward as the strength of the electric current increases with the down stroke of the polished rod 10 as conductor rod 29 passes into the electrical resistance solution 30. The opposite takes place on the upstroke. The electric current from the load battery LB passing through adjustable resistance 76, solenoid coil 99, as adjusted by switch and connections 100, tends to counteract the magnetic attraction of the solenoid coil 93 for solenoid rod 92 in proportion to the decreasing or increasing strength of the electric current through the increasing or decreasing resistance 35 with the decreasing or increasing load on the polished rod 10, thus providing means together with the magnetic attraction of solenoid coil 94 for recording curve IV which represents the plunger stroke with respect to the working barrel considering the polished rod stroke, the stretch in the sucker rod 13 caused by varying load conditions, and the stretch in tubing 12 caused likewise by the varying load conditions as hereinafter more particularly set forth. The adjustable switch and contacts 100 provide means for multiplying the effect of the changes in the strength of the electric current in the load circuit and its magnetic attractive or repulsive effect on solenoid rod 92 for various conditions of sucker rod diameter, depth, and material and various conditions in tubing outside and inside diameter, working barrel depth, and tubing material as hereinafter more particularly described.

In effect, both adjustable switch connections 90 and 100 vary the number of effective wraps or coils of wire in solenoid coils 89 and 99 respectively so that the varying magnetic effect of the varying strength of the electric current in the load circuit 37 may be multiplied as desired due to varying conditions of sucker rod diameter, depth, and material and varying conditions in tubing outside and inside diameter, working barrel depth, and tubing material which affect sucker rod and tubing stretch under varying load conditions as hereinafter more specifically described.

Stated more concisely, the function of the field battery as made effective through the coils 63, 73, 83 and 93 is to balance the rods 62, 72, 82 and 92, for the purpose of obtaining the zero positions of the needles on the arms 61, 71, 81 and 91, thereby providing for the application to said needles of the full effects of current changes taking place in the coils 64, 74, 84, 94, 89 and 99. In order that the proper current adjustments for said coils 63, 73, 83 and 93 may be made, the resistances 65, 75, 85 and 95 are provided. And, in order that the current may be properly varied in each of the coils 64, 74, 84 and 94 to compensate for different well conditions, the resistances 66, 76, 86 and 96 are provided. Also, in order that the load currents passing through the coils 89 and 99 may be properly multiplied, the adjustable switch connections 90 and 100 are respectively provided for the purpose of increasing or decreasing the number of active coil wraps in said coils 89 and 99.

Summarizing, the respective functions of the various coils 64 and 74 as set forth above, are to record automatically the actual movement of the polished rod and the load changes imposed thereupon. The combined functions of the coils 84 and 89 are to record through the medium of the arm 81 the actual plunger stroke with respect to a fixed point, and the combined functions of the coils 94 and 99 are to record through the medium of the needle arm 91 the effective stroke of the plunger that is the stroke of the plunger with respect to the standing valve 17 at the lower end of the working barrel 16. In recording these curves the variations in current passing through the coil 64 cause a corresponding movement of the needle arm 61 which movement taken in conjunction with the timed advancement of the chart results directly in tracing of curve I representing the polished rod stroke, and the variations in current passing through the coil 74 result directly in the tracing of the load curve II by arm 71. The variations in current passing through the coil 84 (which are the stroke variations and are exactly the same as those in coil 64), as modified by the current variations passing through the coil 89 by algebraically adding the negative and positive values represented by the load increment according as the load increases or decreases, result in tracing curve III through the medium of the needle arm 81. Similarly the current variations in coil 94 as modified by the variations in coil 99 caused by load changes as in coil 89, serve to trace curve IV through the medium of the needle arm 91. In the last two instances the load changes as made effective through the coil 89 represent sucker rod stretch and contraction, which influences are combined with the polished rod stroke, and similarly the load changes made effective through the coil 99 represent the combined influences of sucker rod stretch and contraction and tubing stretch and contraction, these influences being combined with the polished rod stroke to represent the effective plunger stroke as seen in curve IV. The mathematical reasons for combining the various effects and why they accomplish the desired results, are more fully set forth hereinafter, the foregoing being intended chiefly to state the actual operation of the structure.

Before further describing the method of adjustment, the functions, and the operation of this device, it will perhaps be helpful to make some observations as to conditions desirable in measuring pump operations and to state certain considerations as to physical conditions existing in a deep well pump and as to physical forces imposed upon such pump. It is evident that measurement of the reciprocating motion of any part of the pump, whether it be the polished rod at the surface or the plunger within the working barrel, must be made with reference to some fixed point, which fixed point may be at the surface and may be taken as the bottom of the stroke of a point on the polished rod. Also the reciprocation of any such part should be measured as a function of time. The free motion of the polished rod if unloaded and perfectly counterbalanced, theoretically should be a sine curve representing as it does simple harmonic motion, and if the sucker rod and tubing were rigid, inelastic members, the movement of the plunger with respect to the working barrel would be identical with the motion of the polished rod at the surface. However, ther are several factors which act to cause departure of the recorded curve of the polished rod from said simple harmonic motion, among these factors being liquid load on the upstroke and not on the downstroke, friction, inertia, momentum, and the like. Also due to the fact that the rod usually is made of steel and therefore is not rigid but is elastic, the motion of the plunger is not identical with the movement of the polished rod at the surface. The variance between the plunger motion and the polished rod motion is a result of the stretch and contraction in the rod as caused by variations in the weight of the liquid load and variations due to friction, momentum, inertia, and rate of power application to the walking beam during various points of the working cycle of the plunger in the working barrel, all of which are recorded in the varying load on the polished rod. The amount of the rod stretch is directly proportional to the total load on the plunger as is well known and as previously pointed out.

The recorded curves I and II representing respectively the motion of the polished rod and the variation in load upon the polished rod, show that when the sucker rod is reciprocated, the total load builds up rapidly to its maximum value during the first part of the upstroke, and after the parts are in full motion the load falls off gradually for the remainder of the upstroke. On the downstroke, the load continues to fall off gradually until the rate of reciprocation of the walking beam begins to slow down materially when the crank pin which operates the walking beam closely approaches dead center whereupon the load begins again to increase due to the momentum developed by the descending sucker rod, said load increasing as dead center is approached and passed and continuing to increase as the next upstroke starts the cycle again. These load changes represent changes in stretch in the rod, and change in rod stretch may be calculated in direct proportion to the load change. By considering both the rod stretch and the polished rod movement, the plunger movement with respect to a fixed point is determinable.

There is also a stretch and contraction in the pump tubing which causes a limited reciprocation of the working barrel which is opposite in direction to the sucker rod stretch and contraction. This is due to the fact that when the polished rod moves upward tending to lift the plunger, the load on the standing valve at the bottom of the working barrel is transferred from said standing valve to the traveling valve, this load transfer tending to stretch the sucker rod and relieve the pump tubing which then contracts, that is, suffers a negative stretch. As the upward motion of the sucker rod progresses, the load on the traveling valve increases to the maximum as friction, inertia, and the like are being overcome and the maximum rod stretch takes place at the same time that the load relief on the standing valve results in the maximum contraction in the pump tubing.

Under these conditions, the upward travel of the plunger at the bottom of the sucker rod in any given time is less than the travel of the polished rod by the amount of the stretch of the sucker rod. When the plunger and its load get under way and friction and inertia have been overcome, a smaller amount of power is required to continue the motion and the load begins to decrease with the result that a contraction takes place in the sucker rod and the plunger tends to move upward an additional amount as measured by the decreasing stretch or contraction, the plunger movement being thereby accelerated, in which case the total plunger movement upward is equal to the polished rod movement plus the amount of contraction or stretch decrease. Simultaneously as the sucker rod stretches due to the increasing load, the tubing contracts with the reduction in the load on the standing valve, and vice versa as the sucker rod contracts due to the decreasing load, the tubing stretches with the increasing load on the standing valve. Therefore, the upward plunger movement with respect to the working barrel is equal to the upward polished rod movement less the amount of sucker rod stretch and less the amount of tubing contraction, or plus the amount of sucker rod contraction and plus the amount of tubing stretch, according to conditions.

After the downstroke of the polished rod commences, downward movement of the plunger will commence as soon as sucker rod contraction becomes less than polished rod movement downward. The load on the polished rod on the downstroke gradually falls off and at the same time a corresponding amount of load is transferred to the standing valve which now carries the load previously on the traveling valve with the result that the pump tubing is stretched to an amount represented by the transferred load. During this load transfer, the downward movement of the plunger will be the movement of the polished rod less the contraction in the sucker rod, and the downward movement of the plunger with respect to the working barrel will be the downward movement of the polished rod less the contraction in the sucker rod and less the stretch in the tubing caused by the increasing load on the standing valve. Thus, since the increasing load on the tubing accompanies decreasing load on the sucker rod and vice versa, it will appear that the tubing stretches as the rod contracts and vice versa.

Obviously, if I calculate the plunger movement by adding or subtracting (as conditions require) the amount of stretch or contraction in the sucker rod, I can in turn calculate the movement of the plunger with respect to the standing valve and thereby obtain the effective plunger travel, by adding or subtracting (as conditions require) the stretch and contraction of the pump tubing.

The present device obtains these computations automatically and requires only to be adjusted in accordance with known conditions existing in the individual case being tested.

In order to more fully explain the principles underlying this device and to describe its adjustment to various conditions, a more complete mathematical analysis will be of assistance.

As stated before, the stretch of the sucker rod (and also of the pump tubing) is directly proportional to the total load and, in line with previous observations, I can also state that the relative motion of the plunger with respect to a fixed point or datum plane is equal to the motion of the polished rod plus or minus the change in total load calculated as stretch.

It is well known that the stretch of an elastic medium, such as a sucker rod or a tube up to its limit of elasticity, is computed by the following formula:

$$S = \frac{P \times 1000 \times L \times 12}{A \times E} \quad (1)$$

where
$S =$ the stretch in inches
$P =$ the load in thousands of pounds
$L =$ the length in feet
$A =$ the cross sectional area in square inches
$E =$ the modulus of elasticity of the material in pounds per square inch.

In calculating the stretch increment in the sucker rod, it is to be remembered that a positive increment in sucker rod stretch results in a negative increment of plunger movement and vice versa. Therefore,
where
$S_r =$ the increment of plunger movement resulting from the stretch increment in the sucker rod in inches
$P_r =$ the load increment on the polished rod in thousands of pounds
and other symbols are as above,
then:

$$S_r = \frac{-P_r \times 1000 \times L \times 12}{A \times E} \quad (2)$$

The polished rod load increment $P_r$ is measured at the surface by means of the dynamometer 34, 35, 36, 38, 39, or by any other load or tension measuring device. Since I always know the modulus of elasticity $E$, the length of the sucker rod $L$, and the cross sectional area of the sucker rod $A$, I am always able to calculate the rod stretch. In making my calculations, the upward movement of the polished rod is measured in positive increments and the downward movement is measured in negative increments. Since an increase in polished rod load represents an increase in rod stretch and since an increase in rod stretch represents a relatively downward plunger movement, therefore a positive polished rod load increment represents a negative increment of plunger movement and vice versa, and a negative polished rod load increment represents a positive increment of plunger movement. The algebraic sum of the polished rod movement increment and the sucker rod stretch increment gives the plunger movement increment with respect to a fixed datum plane, the value being positive if the net movement is upward and negative if the net movement is downward, throughout all positions of the plunger cycle, it being understood that all increments are measured in a fixed time interval and thus exist simultaneously.

Similarly, in calculating the stretch increment in the tubing, it is to be remembered that positive increment of tubing stretch results in a negative increment of working barrel movement.
Therefore, where
$S_t =$ the increment of working barrel movement resulting from the stretch increment in the tubing in inches,
$P_t =$ the load increment on the tubing in thousands of pounds and other symbols are as above
Then:

$$S_t = \frac{-P_t \times 1000 \times L \times 12}{A \times E} \quad (3)$$

In calculating from formula (3), an increase in tubing load represents an increase in tubing stretch and hence a relatively downward working barrel movement; therefore, a positive tubing load increment represents a negative increment of working barrel movement and vice versa, and a negative tubing load increment represents a positive increment of working barrel movement. The working barrel movement increment as calculated therefrom may be added algebraically in other computations and is positive if the working barrel movement is upward and negative if the working barrel movement is downward.

But, as I have demonstrated hereinbefore, a positive polished rod load increment is equal to the corresponding negative tubing load increment and vice versa,
Therefore
$$P_r = -P_t$$
and formula (3) becomes
$$S_t = \frac{P_r \times 1000 \times L \times 12}{A \times E} \quad (5)$$

As above, the polished rod load increment $P_r$ is measured at the surface by means of the dynamometer 34, 35, 36, 38, 39, and since we always know the modulus of elasticity E, the length of the tubing to the working barrel L, and the cross sectional area of the tubing A, we always able to calculate the tubing stretch. In accordance with formula (5) and as hereinbefore demonstrated, a positive polished rod load increment represents a positive working barrel movement increment or an upward movement and vice versa, a negative polished rod load increment represents a negative working barrel movement increment or a downward movement.

Now to determine the plunger movement relative to a fixed point or datum plane, I calculate from the formula:
$$M_{pf} = M_r + S_r \quad (6)$$

Where:
$M_{pf}$=Increment of plunger movement with respect to a fixed point, positive if upward, negative if downward.
$M_r$=Increment of polished rod movement with respect to a fixed point, positive if upward, negative if downward.
$S_r$=Increment of plunger movement resulting from stretch increment in the sucker rod from formula 2, positive or upward when polished rod load increment is negative or decreasing; and negative or downward when polished rod load increment is positive or increasing.

And to determine further the plunger movement relative to the working barrel, I calculate from the formula:
$$M_{pw} = M_r + S_r - S_t \quad (7)$$

Where:
$M_{pw}$=Increment of plunger movement with respect to the working barrel, positive if upward, negative if downward.
$M_r$=Increment of polished rod movement with respect to a fixed point, positive if upward, negative if downward.
$S_r$=Increment of plunger movement resulting from stretch increment in the sucker rod from formula 2, positive or upward when polished rod load increment is negative or decreasing; and negative or downward when polished rod load increment is positive or increasing.
$S_t$=Increment of working barrel movement resulting from stretch increment in the tubing from formula 5, positive or upward when polished rod load increment is positive or increasing, and negative or downward when polished rod load increment is negative or decreasing.

And by combining formulæ (6) and (7):
$$M_{pw} = M_{pf} - S_t$$

To further illustrate the calculations and computations involved, the accompanying tables are presented to give a detailed example, as determined from the curves illustrated in Fig. 3, for a well pumping at 5,000 feet through 2½ inch steel tubing with ¾ inch steel rods. It will be noted that the expression
$$\frac{1000 \times L \times 12}{A \times E}$$
as found in each of formulæ 2, 3 and 5, represents a constant value for any given pumping condition. Therefore, for 5000 feet of ¾ inch steel rods (as given in the example) I find by substituting values in formula 2, that:
$$S_r = -P_r \times 4.5$$

And for 5000 feet of 2½ inch steel tubing, by substituting values in formula 3, I obtain
$$S_t = -P_t \times 1.1$$
But, since
$$P_r = -P_t$$
Therefore,
$$S_t = P_r \times 1.1$$
(also obtainable from formula 5).

Thus, the values 4.5 and 1.1 are the constants respectively represented in formulæ 2, 3 and 5 for this example, and are the factors entering into the figures found in columns (4) and (5) of the following tables:

| Time in seconds | Polished rod load—thousands of pounds | Increment in polished rod load—thousands of pounds | Increment in sucker rod stretch in inches | Increment in tubing stretch in inches | Total polished rod stroke with respect to a fixed point—inches | Increment in polished rod stroke with respect to a fixed point—inches | Total plunger stroke with respect to a fixed point—inches | Increment in plunger stroke with respect to a fixed point—inches | Total plunger stroke with respect to a working barrel—inches | Increment in plunger stroke with respect to working barrel—inches |
|---|---|---|---|---|---|---|---|---|---|---|
| (1) | (2) | (3) | (4) | (5) | (6) | (7) | (8) | (9) | (10) | (11) |
| 1.00 | 10 | | | | 0 | | 12.5 | | 18.0 | |
| 1.25 | 11 | 1 | −4.5 | 1.1 | 2 | 2 | 10.0 | −2.5 | 14.4 | −3.6 |
| 1.50 | 15 | 4 | −18.0 | 4.4 | 10 | 8 | 0 | −10.0 | 0 | −14.4 |
| 1.75 | 13 | −2 | 9.0 | −2.2 | 21 | 11 | 20.0 | 20.0 | 22.2 | 22.2 |
| 2.00 | 12 | −1 | 4.5 | −1.1 | 32 | 11 | 35.5 | 15.5 | 38.8 | 16.6 |
| 2.25 | 10 | −2 | 9.0 | −2.2 | 40 | 8 | 52.5 | 17.0 | 58.0 | 19.2 |
| 2.50 | 8 | −2 | 9.0 | −2.2 | 42 | 2 | 63.5 | 11.0 | 71.2 | 13.2 |
| 2.75 | 7 | −1 | 4.5 | −1.1 | 40 | −2 | 66.0 | 2.5 | 74.8 | 3.6 |
| 3.00 | 5 | −2 | 9.0 | −2.2 | 32 | −8 | 67.0 | 1.0 | 78.0 | 3.2 |
| 3.25 | 5 | 0 | 0 | 0 | 21 | −11 | 56.0 | −11.0 | 67.0 | −11.0 |
| 3.50 | 5 | 0 | 0 | 0 | 10 | −11 | 45.0 | −11.0 | 56.0 | −11.0 |
| 3.75 | 5 | 0 | 0 | 0 | 2 | −8 | 37.0 | −8.0 | 48.0 | −8.0 |
| 4.00 | 10 | 5 | −22.5 | 5.5 | 0 | −2 | 12.5 | −24.5 | 18.0 | −30.0 |

The values in these columns have been obtained as follows:
Column (1) from the chart
Column (2) from the chart (curve II)
Column (3) from column (2)
Column (4) from column (3) × (−4.5)
Column (5) from column (3) × (1.1)
Column (6) from chart (curve I)
Column (7) from column (6)
Column (8) from column (7) + column (4)
Column (9) from column (8) (curve III)
Column (10) from column (8) − column (5)
Column (11) from column (9) (curve IV)

In order to explain more particularly the operation of automatically calculating and recording the curves on chart 40 in their relation to the preceding mathematical formulæ, let us consider the following:

Curve I which represents the polished rod stroke with respect to a fixed point, as inscribed on chart 40 is developed as increments positive and negative, per time interval directly proportional to the strength of the electric current flowing through solenoid coil 64, variable resistance 29, 30, 32 and the other parts of the stroke circuit which we will term circuit I.

Curve II which represents the polished rod load, as inscribed on chart 40 is developed as increments, positive and negative, per time interval directly proportional to the strength of the electric current flowing through solenoid coil 74, variable resistance 35 and the other parts of the load circuit which we will term circuit II.

Curve III which represents the plunger stroke with respect to a fixed point, as inscribed on chart 40 is developed as increments, positive and negative, per time interval directly proportional to the resultant effects (1st) of the strength of the electric current flowing through solenoid coil 84 which is the same as that flowing through solenoid coil 64 of circuit I, and (2nd) of the strength of the electric current flowing through solenoid coil 89 which is the same as that flowing through solenoid coil 74 of circuit II multiplied by the proper constant. Now, by formula (6), to obtain the plunger stroke increment with respect to a fixed point, I must add to the polished rod stroke increment (positive or negative) the sucker rod stretch increment (positive or negative) which is equal to the negative value of the polished rod load increment (positive or negative) multiplied by a constant, which in the example is 4.5.

By referring to the electrical wiring in Fig. 3, it will be found that this is accomplished. In following the circuits, it should be noted first that as previously developed, the stroke current in coil 84 increases as the polish rod moves on its downstroke by reason of the fact that the resistance rod 29 descends into the resistance solution 30, and that the load current through the coil 89 increases as the load increases due to the increased conductivity in the carbon stack 35. It will be remembered that, normally, when the polished rod moves on the down stroke the load decreases with the result that the sucker rod contracts, and the plunger movement therefore is equal to the polished rod movement less the amount of contraction, and similarly in normal movement of the polished rod on the up stroke the load increases resulting in stretch of the sucker rod so that the actual plunger movement is equal to the polished rod movement less the amount of stretch. In order to accomplish the necessary subtraction the current through the coil wraps 89 is passed in the opposite direction to that through the balance coil 83. In practice the current through the balance coil 83 will be adjusted by means of variable resistance 85 to balance both the minimum stroke current through solenoid coil 84 and the minimum load current through load coil 89, the latter being multiplied by the proper factor through the expedient of cutting in by means of switch 90 the additional number of wraps of coil 89 that may be required, which in the example is 4.5. With this construction, when the load increases, thus causing stretch in the sucker rod, the current through the load coil 89 increases and the solenoid core 82 tends to move down accordingly; also upon the down stroke of the polished rod the current through solenoid coil 84 increases and the core 82 tends to move down. Likewise when the load decreases the core 82 tends to move upward; also upon the up stroke of the polished rod the core 82 tends to move upward due to the decreasing current in coil 84. Now, when the polished rod moves on its down stroke, thereby increasing the current through coil 84 and causing proportionate downward movement of the core 82 against the influence of balance coil 83, the load normally decreases, contraction in the sucker rod takes place, and the current in coil 89 decreases and thereby counteracts the current in balance coil 83 to a lesser degree so that the current in said coil 83 has a stronger tendency to elevate the rod 82 against the attraction of the coil 84, the actual core movement however being downward, although at a decreasing rate as the load current decreases. In this manner the movement increment due to load change is deducted from the movement increment due to stroke increment. Similarly when the polish rod moves upward the decreasing current through coil 84 permits proportionate upward movement of the core 82 under influences of the balance coil 83. And at the same time the load normally increases resulting in stretch of the sucker rod which must be deducted from the polished rod movement to give the actual plunger movement upward. Under this load increase the current through coil 89 increases thereby counteracting more of the current through coil 83 thus reducing the energy of coil 83 and thereby offsetting a portion of the upward movement of the core 82 with the result that in this case also the movement increment due to the load increase is deducted from the movement increment due to the up stroke increment thereby giving the actual increment of upward plunger movement.

However, in the well from which the curves shown on the chart were taken, the changes in load near the opposite ends of the stroke were so great that the rod stretch and contraction served actually to increase the plunger stroke, due to the fact that the load continued to build up to a high point after the bottom of the down stroke had been passed and the up stroke had been commenced, thus resulting in considerable stretch and continued downward movement of the plunger, and due also to the fact that after the top of the up stroke had been passed and the down stroke commenced the previously falling-off load continued to fall off so that contraction in the sucker rod continued to an extent sufficient to produce a continued upward plunger movement.

Stating these effects otherwise, to the polished rod stroke increment which is obtained by the strength of the electric current of circuit I in solenoid coil 84, I add the negative value of the polished rod load increment which is obtained by the strength of the electric current of circuit II in solenoid coil 89, multiplied in effective strength by the number of wraps of wire in solenoid coil 89 which is adjustable through switch and contacts 90 to the desired degree, e. g., in this example 4.5 times the original effective strength as in solenoid coil 74.

Curve IV which represents the plunger stroke with respect to the working barrel, as inscribed on chart 40 is developed as increments, positive and negative, per time interval, directly proportional to the resultant effects (1st) of the strength of the electric current flowing through solenoid coil 94 which is the same as that flowing through solenoid coil 64 of circuit I, and (2nd) of the strength of the electric current flowing through solenoid coil 99 which is the same as that flowing through solenoid coil 74 of circuit II. Now, by formula (7), to obtain the plunger stroke increment with respect to the working barrel, I must add to the polished rod stroke increment (positive or negative) the sucker rod stretch increment (positive or negative) which is equal to the negative value of the polished rod load increment (positive or negative) multiplied by a constant (which in the example is 4.5) and subtract the tubing stretch increment which is equal to the positive value of the polished rod load increment multiplied by a constant (which in the example is 1.1); or, in effect, to the polished rod stroke increment, I add the negative value of the polished rod load increment multiplied by a constant which is equal to the sum of the two aforementioned constants, (which in the example is 5.6). By referring to the electrical wiring in Fig. 3, it is evident that this is accomplished, the operation being the same as that described in connection with the operation of coils 83, 84 and 89 to obtain curve III. Or more particularly stated, to the polished rod stroke increment which is obtained by the strength of the electric current of circuit I in the solenoid coil 94, we add the negative value of the polished rod load increment which is obtained by the strength of the electric current of circuit II in solenoid coil 99, multiplied in effective strength by the number of coils of wire or wraps in solenoid coil 99 which is adjustable through switch and contacts 100 to the desired degree, e. g., in this example, 5.6 times the original effective strength as in solenoid coil 74.

It is therefore evident that the mathematical calculations as hereinbefore completely described are automatically and accurately accomplished through the operation of the devices illustrated in Figs. 2 and 3 and elsewhere hereinbefore described, and that such calculations are automatically and accurately incorporated in curves I, II, III and IV as inscribed on chart 40.

Having obtained the various time-space curves I, II, III and IV, they will be studied by an experienced operator who will be able ordinarily to arrive at some conclusion as to the causes of the irregularities in the curves III and IV and will therefore be able to modify pumping conditions or parts of the pumping equipment in order that a uniform curve of maximum amplitude may be approached as near as possible, such a curve being the result of optimum conditions and therefore being the curve which the operator is always anxious to obtain. For example, the humps in curves III and IV as shown are probably due to a sticking plunger which can be easily remedied by replacement of plunger and working barrel.

Thus, specifically, by employing a polish-rod stroke-measuring device together with a dynamometer for measuring load variations on said rod, and then combining the effects of both devices, I may obtain results which constitute measurements of the actual plunger movement with respect to a fixed point and measurements of the effective plunger movement or the relation of the plunger movement to the standing valve.

Or, more broadly considered, if I measure at an available point the stroke and load of an elastic member loaded at a remote point, and combine such measurements while at the same time modifying them by known constants, I may obtain the actual movement or effective movement at the remote point.

It should be understood that these disclosures are merely illustrative of the generic invention, and that many modifications within the scope thereof may be made by those skilled in the art.

I claim:

1. An electrical dynamometer for an elastic member undergoing movement and elastic deformation, comprising a source of current, a solenoid operatively connected to said source of current, means for varying said current in response to said motion, and means for imposing a balancing flux on said solenoid.

2. An electric dynamometer for an elastic member undergoing motion and elastic deformation comprising electric means responsive to movement of the member, electric means responsive to variations in load imposed upon the elastic member, means for controlling the passage of a variable current corresponding with variations in load and motion, a solenoid winding through which said current variations pass, an indicator movable under the influence of said current variations, and a second winding through which a current is passed for resisting effects of the variable current.

3. An electric dynamometer and stroke meter for a deep well pump having an elastic sucker rod provided at its lower end with a plunger comprising electric means for measuring variations in stroke in the upper end of the rod by controlling the passage of a variable current corresponding with variations in stroke, a coil through which said variable current passes, an indicator movable under the influence of said coil, and a field coil through which a current is passed for balancing said indicator, electric means for measuring variations in load imposed upon said rod by controlling the passage of a variable current corresponding with said load variations, an additional coil through which the last mentioned variations are passed, an indicator movable under influence of the current passing through said additional coil, a second field coil through which a constant current is passed to balance said second indicator, means for multiplying the effect of the the current responsive to load changes, a third indicating means movable under the combined influence of the variable current due to stroke change and the said multiplied current effect for indicating plunger movement as a resultant of rod stroke and load, a second multiplying means for multiplying the effect of the current responsive to load to develop the resultant of combined rod and tubing load, a fourth indicating means movable under the combined influence of the variable current due to stroke changes and the second mentioned multiplied current effect to indicate the effective movement of the plunger with respect to the tubing as a resultant of rod-stroke and load variations.

4. An electric dynamometer and stroke meter comprising electric means for measuring at a proximate point the load imposed at such point upon an elastic member variably loaded at a remote point, said measuring means being adapted to pass a variable current in proportion to load variations, means to convert said variable current into variable magnetic fluxes, an indicating member movable by said magnetic fluxes, means supplying a current of constant value, and means for converting the constant current into constant magnetic fluxes, said constant fluxes also acting upon said indicating member and in opposition to the variable fluxes.

Signed at Los Angeles, in the county of Los Angeles, and State of California, this 10th day of August A. D. 1928.

FRANCIS W. LAKE.